(12) United States Patent
Raets et al.

(10) Patent No.: US 6,490,175 B2
(45) Date of Patent: Dec. 3, 2002

(54) DC TO DC CONVERTER

(75) Inventors: Hubert Raets, Landgraaf (NL); Ulrich Boeke, Geilenkirchen (DE); Dirk Hente, Wuerselen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/836,085

(22) Filed: Apr. 17, 2001

(65) Prior Publication Data

US 2001/0036087 A1 Nov. 1, 2001

(30) Foreign Application Priority Data

Apr. 26, 2000 (DE) .......................................... 100 20 357

(51) Int. Cl.7 ............................................. H02M 3/335
(52) U.S. Cl. ........................................................ 363/17
(58) Field of Search .............................. 363/16, 17, 95, 363/97, 131, 132, 56.01, 56.02

(56) References Cited

U.S. PATENT DOCUMENTS

| 4,628,426 A | | 12/1986 | Steigerwald | ................... 363/17 |
| 5,500,791 A | * | 3/1996 | Khraluwala et al. | .......... 363/17 |
| 5,568,368 A | * | 10/1996 | Steigerwald et al. | .......... 363/17 |
| 5,877,945 A | * | 3/1999 | Liu | .............................. 363/17 |
| 6,304,461 B1 | * | 10/2001 | Walker | ......................... 363/17 |

* cited by examiner

Primary Examiner—Matthew Nguyen
(74) Attorney, Agent, or Firm—Dicran Halajian (57) ABSTRACT

A DC to DC converter converts a DC input voltage into a plurality of DC output voltages and includes a circuit stage having switching elements for converting a DC input voltage into a first AC signal ($V_{AC1}$). A first resonant circuit converts a first AC signal into a second AC signal which is used for forming a first DC output voltage. A second resonant circuit converts the first AC signal into a third AC signal which is used for forming a second DC output voltage. A control circuit sets various frequency ranges for the first AC signal to set various supply power modes, such as for normal operation and standby mode.

15 Claims, 8 Drawing Sheets

DC TO DC CONVERTER

FIELD OF THE INVENTION

The invention relates to a DC to DC converter for converting a DC input voltage into a plurality of DC output voltages.

BACKGROUND OF THE INVENTION

Such a DC to DC converter is known from U.S. Pat. No. 4,628,426. In the converter described there, a DC input voltage is converted into a (pulse-shaped) AC signal by means of a full-bridge circuit comprising four switching elements, which AC signal is applied to the primary winding of a transformer. The transformer has two secondary windings. An AC signal produced by the first secondary winding is rectified and filtered to generate a first DC output voltage. The second secondary winding is connected in parallel to a resonant circuit capacitor which, together with the leakage inductance of the second secondary winding, forms a resonant circuit. A voltage dropping at the resonant circuit conductor is rectified and filtered to thus generate a second DC output voltage. The two DC output voltages are set to desired voltage values by respectively driving the switching elements of the full-bridge circuit and thus by adapting the AC signal produced by the full-bridge circuit. The first DC output voltage is set via an adaptation of the sampling ratio of the AC signal. The second DC output voltage is set via an adaptation of the frequency of the AC signal. The two DC output voltages can ideally be set independently of each other.

SUMMARY OF THE INVENTION

It is an object of the invention to provide the converter of the type defined in the opening paragraph so that the losses occurring when the converter is being operated are smallest possible.

The object is achieved in that the DC to DC converter mentioned in the opening paragraph includes

- a circuit stage including switching elements for converting the DC input voltage into a first AC signal,
- a first resonant circuit for converting the first AC signal into a second AC signal, which is used for forming a first DC output voltage,
- a second resonant circuit for converting the first AC signal into a third AC signal, which is used for forming a second DC output voltage, and
- a control circuit for setting various frequency ranges for the first AC signal.

This converter arrangement is particularly advantageous when the second DC output voltage is used for producing a DC standby supply voltage when the converter is being operated, while the first DC output voltage then becomes zero. In this operating mode there is only a small load on the second DC output voltage. Nevertheless, with the converter according to the invention a so-called ZVS operation (Zero Voltage Switching) of the switching elements of the circuit stage producing the first AC signal, which includes, for example, a half-bridge or a full-bridge circuit, is ensured (for a full understanding of the ZVS operation compare, for example, U.S. Pat. No. 5,808,879, which is not the case with said U.S. Pat. No. 4,628,426. With the converter according to the invention, the losses in the standby mode are reduced. The circuitry for realizing a normal operation and a standby mode is kept smallest possible. Normal operation and standby mode are set only via a suitable setting of the frequency range of the first AC signal and a respective drive of the switching elements of the said circuit stage. Different frequency ranges are then assigned to normal operation and standby mode. The frequency range assigned to the standby mode contains the resonant frequency of the second resonant circuit, which leads to the fact that the first DC output voltage is strongly reduced compared to the normal operation. A constant control of the output voltages is effected via a fine adjustment of the frequency in the respective frequency range.

Advantageous embodiments of the DC to DC converter are defined in the dependent claims. The invention also relates to a power supply that includes the DC to DC converter according to the invention.

Examples of embodiment of the invention will be described in more detail hereinafter with reference to the drawings, in which:

DETAILED DESCRIPTION OF THE INVENTION

Figure 1:
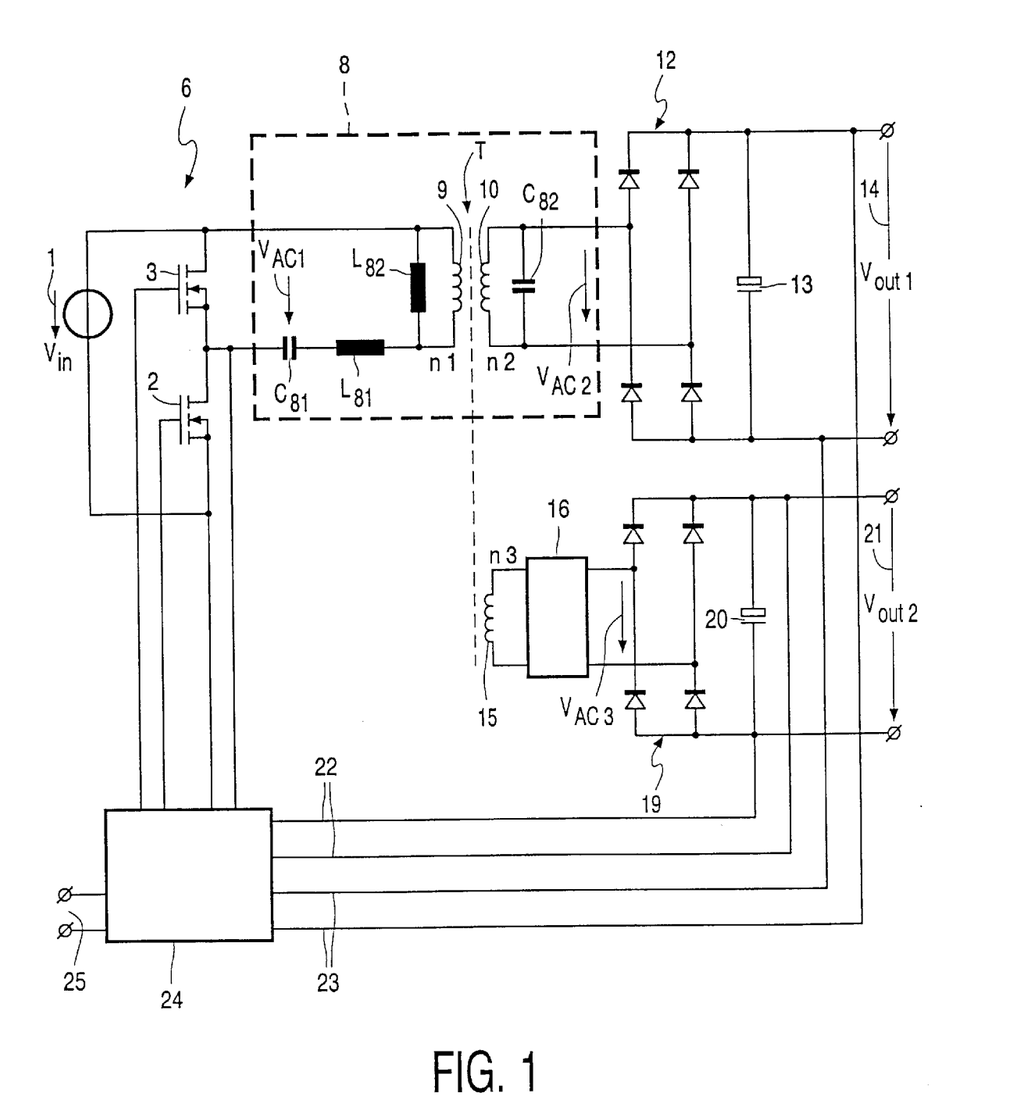
FIG. 1 shows a DC to DC converter that includes a half-bridge circuit.

The DC to DC converter shown in FIG. 1 converts a DC input voltage 1 ($V_{in}$) into a first DC output voltage 14 ($V_{out1}$) and a second DC output voltage 21 ($V_{out2}$). A circuit stage 6 converts the DC input voltage 1 into a first AC signal $V_{AC1}$. For this purpose, the circuit stage 6 includes a half-bridge circuit with two switching elements 2 and 3 which are shown here as MOSFET transistors. The AC signal $V_{AC1}$ is applied to a first resonant circuit 8, which converts the AC signal $V_{AC1}$ into a second AC signal $V_{AC2}$. The signal $V_{AC2}$ is rectified by means of a rectifier bridge circuit 12 and filtered by means of a smoothing capacitor 13. Finally, the first output voltage 14 is tapped from the smoothing capacitor 13.

Figure 3:
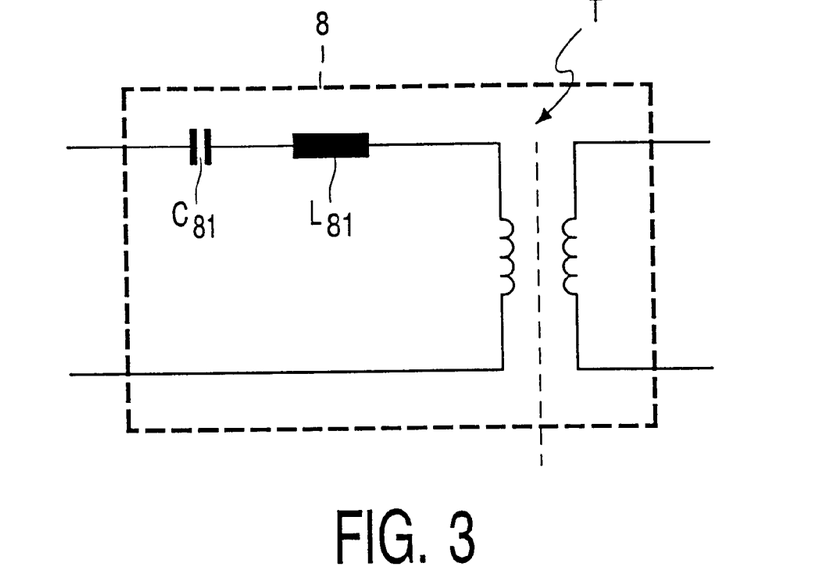
FIGS. 3 and 4 show several variants of embodiment of a first converter resonant circuit.
Figure 4:
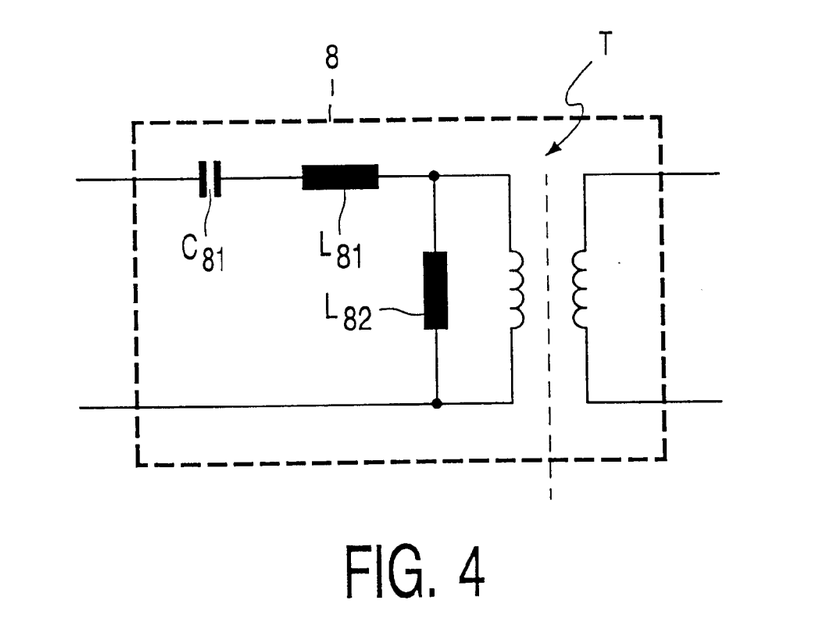

The resonant circuit 8 has the following structure in FIG. 1: connected in series to the resonant circuit 8 is a series combination of a capacitive element $C_{s1}$ and an inductive element $L_{s1}$; to the series combination is connected in parallel an inductive element $L_{s2}$, which is connected in parallel to the primary winding 9 (number of windings n1 )

of a transformer T, which has two secondary windings of which the first one belongs to the resonant circuit 8. Connected in parallel to the first secondary winding 10 (number of windings n2) of the transformer T is a capacitive element $C_{82}$, which in its turn is connected in parallel to the output of the resonant circuit 8 and at which the voltage $V_{AC2}$ drops. Further variants of embodiment of the resonant circuit 8 are shown in the FIGS. 3 and 4. In FIG. 3 the resonant circuit 8 has only one capacitive and one inductive element. In FIG. 4 the resonant circuit 8 has one capacitive and two inductive elements.

Figure 5:
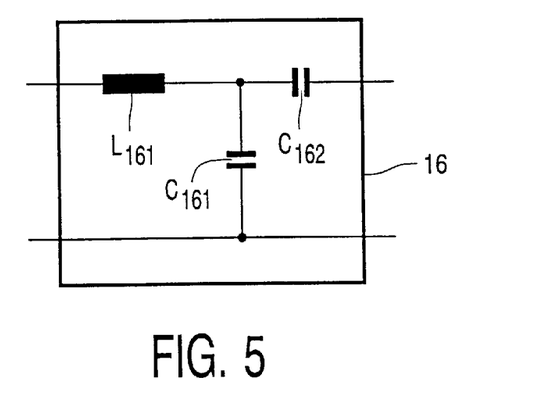
FIGS. 5 to 12 show various circuits for a second converter resonant circuit.
Figure 8:
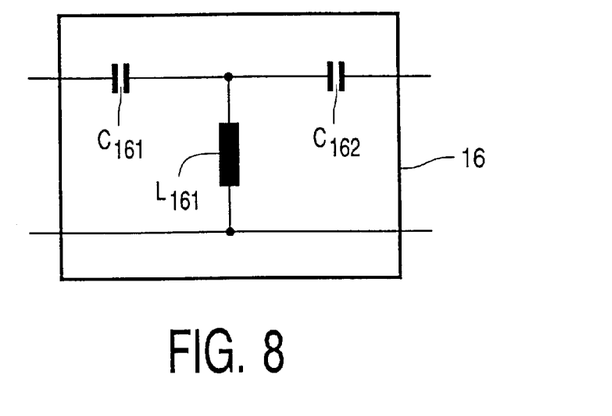

The DC to DC converter shown in FIG. 1 further includes a second resonant circuit 16 to which is applied the voltage dropping at a second secondary winding 15 (number of windings n3) of the transformer T and which includes, more particularly, a switching circuit shown in FIG. 5 with one inductive element $L_{161}$ and two capacitive elements $C_{161}$ and $C_{162}$. A connection of the capacitive element $C_{161}$ is then connected both to one of the input terminals of the resonant circuit and to one of the output terminals of the resonant circuit. The other terminal of the capacitive element $C_{161}$ is linked to the connection between the inductive element $L_{161}$ and the capacitive element $C_{162}$, whose two other terminals are connected to the other input terminal of the resonant circuit or the other output terminal of the resonant circuit, respectively. The resonant circuit 16 converts a voltage dropping at the winding 15 into a voltage $V_{AC3}$ (third AC signal), which is rectified by a bridge rectifier circuit 19 and filtered by means of a smoothing capacitor 20. From the smoothing capacitor 20 can be tapped a second DC output voltage 21 ($V_{out2}$). In the variant of the resonant circuit 16 as shown in FIG. 8, only the elements $L_{161}$ and $C_{161}$ are exchanged compared to the variant shown in FIG. 5.

Figure 6:
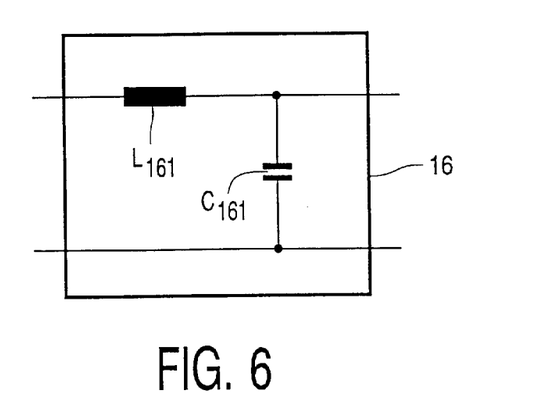
Figure 7:
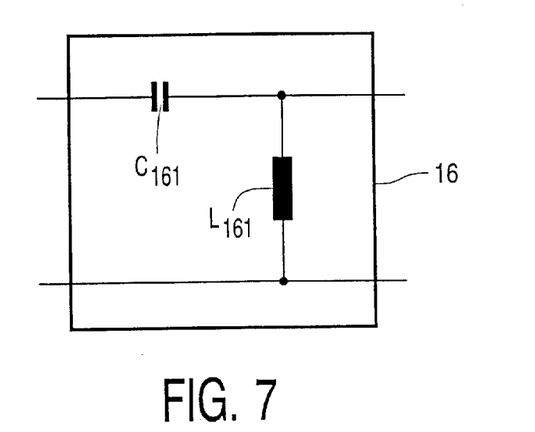
Figure 9:
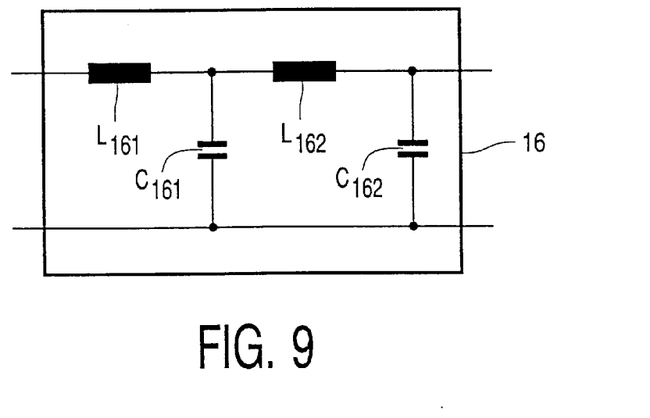
Figure 10:
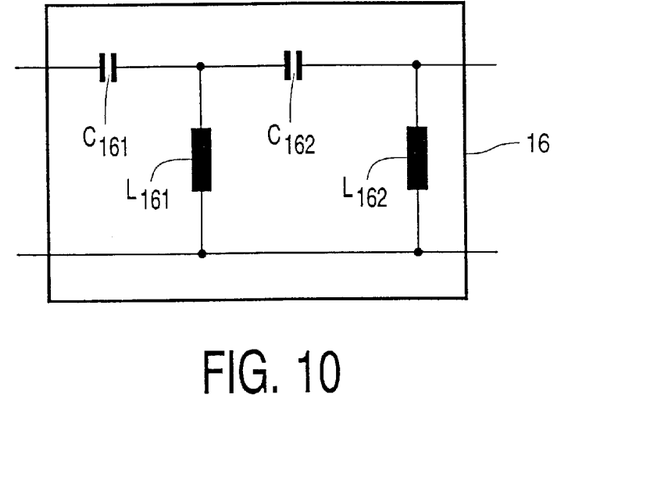
Figure 11:
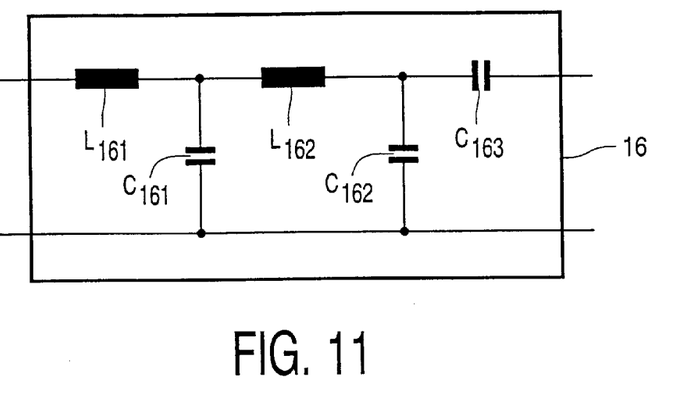

Further possibilities of embodiment for the resonant circuit 16 are shown in FIGS. 6 to 7 and 9 to 12. FIGS. 6 and 7 show variants of a resonant circuit with a capacitive and an inductive element. FIGS. 9 and 10 show variants of a resonant circuit including two capacitive and two inductive elements. FIG. 11 shows a variant of the resonant circuit with three capacitive and two inductive elements and FIG. 12 finally shows a variant of a resonant circuit with three capacitive and two inductive elements.

A control circuit 24 produces the control signals for the switching elements 2 and 3 of the half bridge 6. It evaluates the output voltages 14 and 21 and, in dependence on the measured output voltages, controls the switching frequency f of the switching elements 2 and 3 and thus the frequency of the AC signal $V_{AC1}$. Via a digital input 25 a (1-bit) control signal is applied to the control circuit 24, with which signal (two) different working modes of the DC to DC converter can be set, here the normal mode and the standby mode. This has the advantage that the switch (not shown) used for switching on and off need not be arranged for a high mains voltage, but only for a low voltage level (for example five volts) customary for digital circuits.

By controlling the frequency f, the output voltages 14 and 21 are constantly regulated to predefinable set values with normal regulating mechanisms, to compensate, for example, for variations of a mains voltage or the variations of the load on the converter outputs. For this purpose, the output voltages 14 and 21 are applied to the control circuit 24 via feedback paths 22 and 23.

Figure 2:
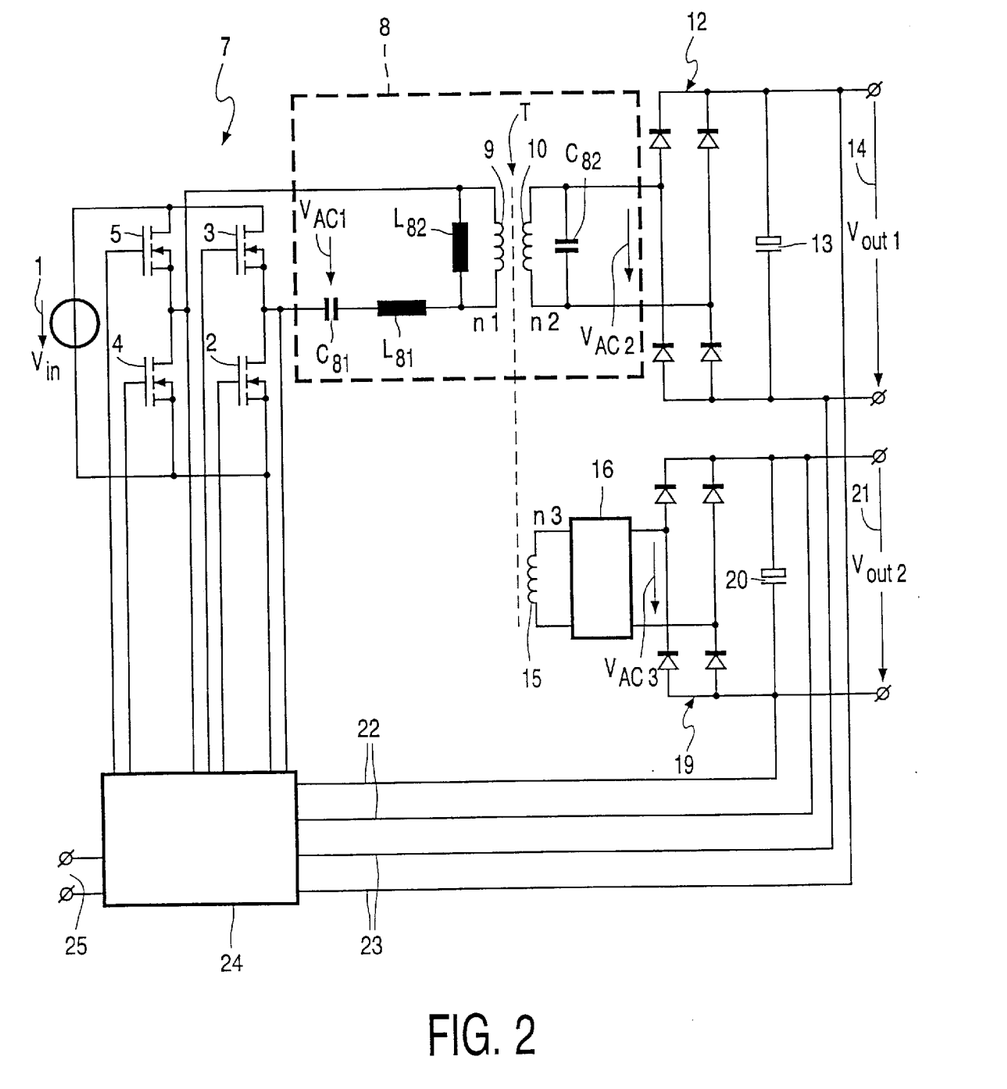
FIG. 2 shows a DC to DC converter that includes a full-bridge circuit.

FIG. 2 shows a further possibility of embodiment for the DC to DC converter. Compared to the converter shown in FIG. 1, a full bridge 7 with four switching elements 2, 3, 4 and 5 is substituted for the half bridge 6.

If the design of the transformer T is suitably selected, the resonant circuit elements of the resonant circuits 8 and 16 are at least partly realized by the transformer T itself; for example, the inductive elements $L_{81}$ and $L_{16}$ may be realized partly or in full by the respective leakage inductances of the transformer T. The transformer is used for separating the potential between the AC signals $V_{AC1}$, $V_{AC2}$ and $V_{AC3}$.

Figure 13:
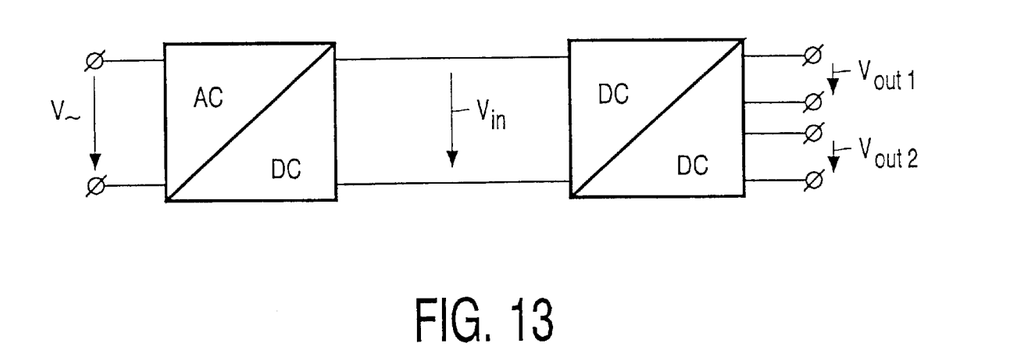
FIG. 13 shows a power supply that includes a DC to DC converter according to the invention.

FIG. 13 shows a power supply with a DC to DC converter according to the invention, preceded by an AC to DC converter which converts an AC mains voltage V into the DC input voltage $V_{in}$ applied to the DC to DC converter.

Figure 14:
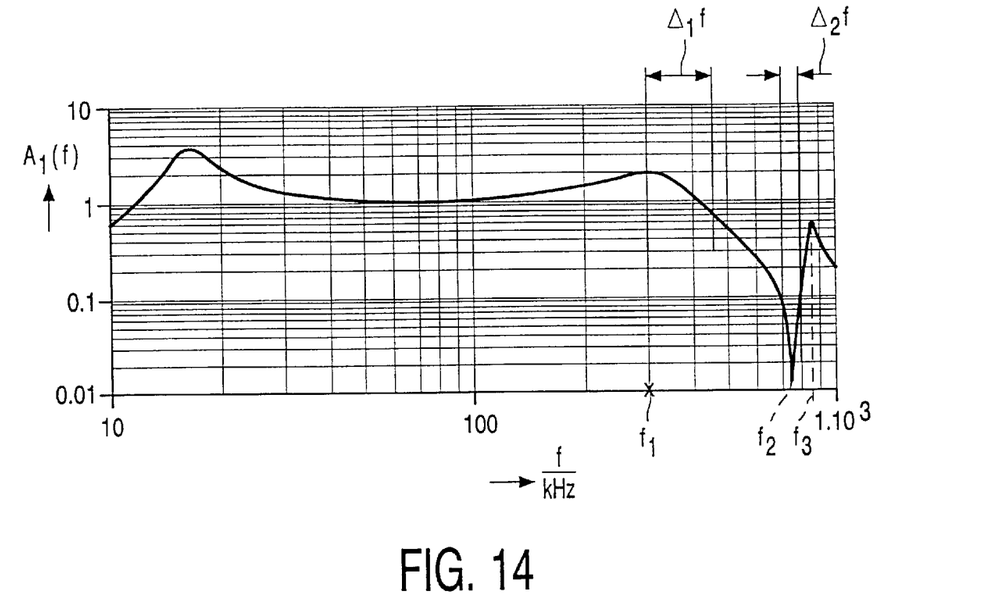
FIGS. 14 and 15 show converter transfer functions relating to two converter output voltages and FIG. 16 shows a circuit for realizing the converter without a transformer.
Figure 15:
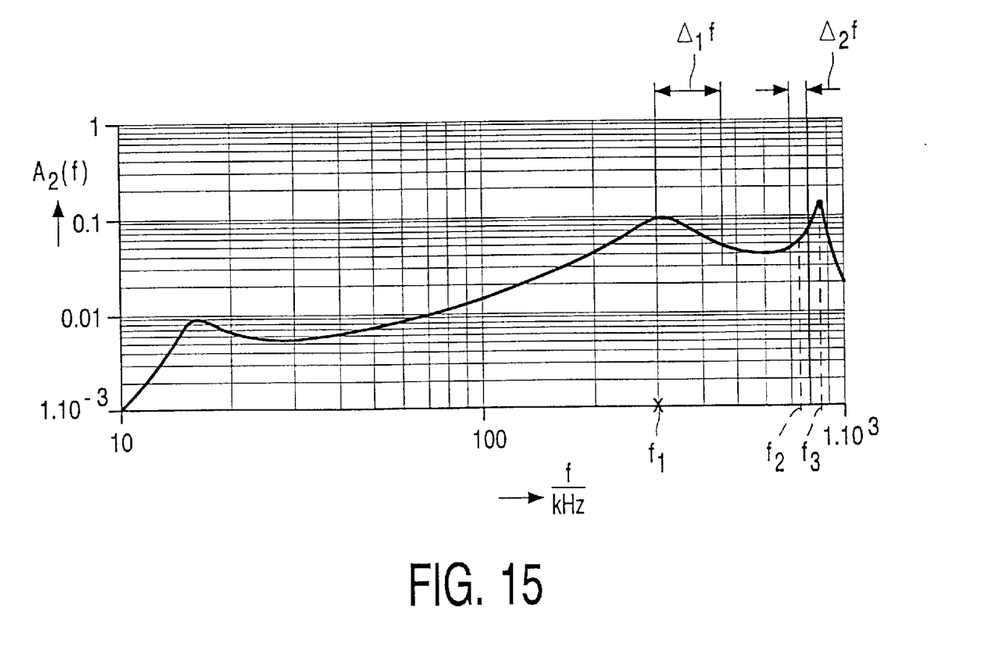

FIGS. 14 and 15 show transfer functions $A_1(f)=V_{out1}/V_{in}$ and $A_2(f)=V_{out2}/V_{in}$ of the DC to DC converter according to the invention in dependence on the frequency f of the AC signal $V_{AC1}$ for a resonant circuit 8 shown in FIG. 1 and a resonant circuit 16 shown in FIG. 5. Frequency ranges $\Delta_1 f$ and $\Delta_2 f$ feature the frequencies which are provided for two modes of the DC to DC converter. These modes of operation are controlled by applying a digital signal (here by applying a 1-bit digital signal). The position and width of the frequency ranges are adapted in dependence on the desired modes of operation, while especially the position of the resonant frequencies of the resonant circuits 8 and 16 is taken into account. The frequency range $\Delta_1 f$ here corresponds to a power supply mode of the DC to DC converter in normal operation, in which the converter is used for supplying power to an electric device which is in normal operation (for example from the range of entertainment electronics) (not further shown) via the DC output voltage $V_{out1}$. The frequency range $\Delta_2 f$ is used for a standby power supply mode of the DC to DC converter in which the converter is used as a standby power supply of the electric device, while a standby module of the electric device is supplied with a small DC output voltage $V_{out2}$ and the DC output voltage $V_{out1}$ is strongly reduced and here becomes substantially zero. In the case at hand the DC output voltage $V_{out2}$ is kept in approximately the same voltage range in the two power supply modes, i.e. there is a power supply of a standby mode of an electric device also in the power supply mode of the normal operation. The bottom limit of the frequency range $\Delta_1 f$ lies at a frequency that exceeds or is equal to the maximum resonant frequency $f_1$ of the first resonant circuit 8. In FIGS. 14 and 15 the bottom limit of the frequency range $A_1 f$ is equal to the resonant frequency $f_1$. For increasing frequencies the value of the transfer function of the resonant circuit 8 decreases, so that there is ensured that the half bridge 6 or the full bridge 7, respectively, is inductively loaded both in the power supply mode of normal operation and of standby mode. This inductive load, together with capacitors (not shown) connected in parallel to the switching elements of the half bridge 6 or fully bridge 7, respectively (these capacitors may be capacitors connected in parallel to the switching elements and/or parasitic capacitors of the switching elements), a ZVS mode of the switching elements 2 and 3 or 2, 3, 4 and 5, respectively, in all the power supply modes.

The frequency $f_2$ indicates the resonant frequency of the resonant circuit 16. Starting from the frequency $f_1$, the function $A_1(f)$ intersects a minimum and, based on the input impedance of the resonant circuit 16 and increases again up to a maximum at the frequency $f_3$. The converter circuit is now dimensioned such that the frequency range $\Delta_2 f$ lies between said minimum of $A_1(f)$ and the frequency $f_3$, so that the associated value ranges in the frequency ranges $\Delta_1(f)$ and $\Delta_2(f)$ are the same or substantially the same, so that the power supply of a standby module is ensured by means of the output voltage $V_{out2}$ both in the power supply mode for normal operation and in the power supply mode for standby. Furthermore, $f_2$ denotes the frequency from the frequency range $\Delta_2(f)$ at which $A_1 f$ reaches a minimum. The frequency $f_2$ is preferably put approximately in the middle of the frequency range $\Delta_2 f$.

Figure 12:
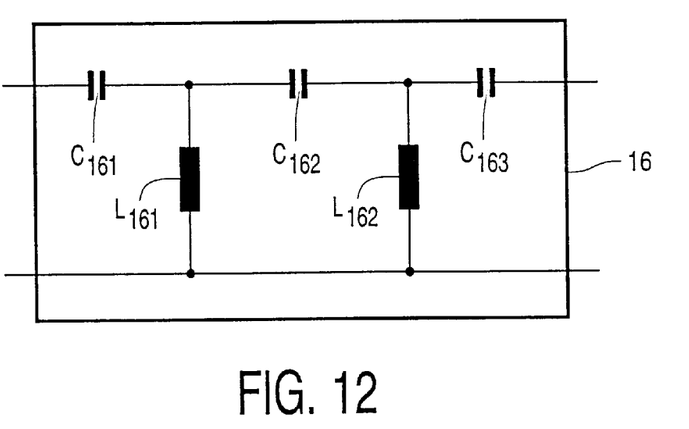

The frequency range $\Delta_2 f$ is widened according as the number of inductive/capacitive elements of the resonant circuit 16 are increased and is widest in the examples of embodiment shown in the variants of embodiment shown in FIGS. 11 and 12. A widened frequency range $\Delta_2 f$ is advantageous in that for the converter modules used, small tolerance values may be set. The use of a smaller number of inductive/capacitive elements for the resonant circuit 16 leads to accordingly reduced costs.

Figure 16:
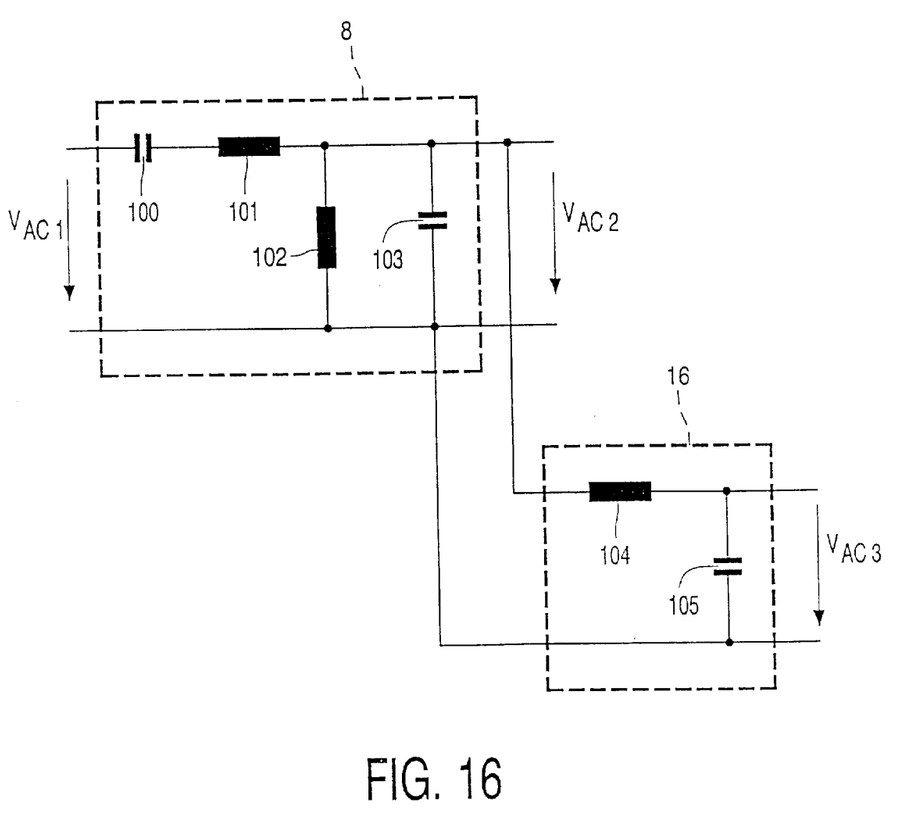

FIG. 16 shows a circuit arrangement for the DC to DC converter according to the invention, in which the first resonant circuit 8 and the second resonant circuit 16 are coupled without the use of a transformer. To the input of the resonant circuit 8 is applied the first AC signal $V_{AC1}$; on the output the resonant circuit 8 produces the second AC signal $V_{AC2}$. The second resonant circuit 16 here too produces the third AC signal $V_{AC3}$. The first resonant circuit in this variant of embodiment has two capacitive and two inductive elements. To an input terminal of the resonant circuit 8 is connected a series combination of one capacitive element 100 and one inductive element 101. Between the opposite terminal of this series combination and the other input terminal of the resonant circuit 8 lies a parallel combination of an inductive element 102 and a capacitive element 103, from which parallel combination also the AC signal $V_{AC2}$ may be tapped. Between the output terminals of the resonant circuit 8 lies furthermore a series combination of an inductive element 104 and a capacitive element 105. The two elements 104 and 105 form the second resonant circuit 16.

From the capacitive element 105 may be tapped the third AC signal $V_{AC3}$. Within the range of the resonant frequency of the second resonant circuit 16, the series combination of the elements 104 and 105, when supplied with an AC voltage, acts as a short-circuit so that the AC signal $V_{AC2}$ drops to zero. If this is used for the standby power supply mode (in the neighborhood of the resonant frequency lies a respective frequency range $\Delta_2 f$). In the power supply mode during normal operation, the two AC signals are regulated to the suitable values (again corresponds to a frequency range ($\Delta_1 f$)). The explanations used above can be respectively applied to this variant of embodiment.

The half-bridge circuit 6 shown in FIG. 1, or the half-bridge circuit 7, respectively, are preferably operated in a burst mode in the standby power supply mode. This means that successive time spaces $t_i$ are provided, which are respectively subdivided into two time slots $t_{i1}$ and $ti_2$. In the respective time slot $t_{i1}$ the switching elements 2 and 3 or 2 to 5, respectively, are turned on and off, respectively, to generate the first AC signal $V_{AC1}$. In the respective time slot $t_{i2}$ all the switches are turned off, so that the AC signal $V_{AC1}$ for this time slot has the zero value; in the time slots $t_{i2}$ the energy for maintaining the output voltage $V_{out2}$ is produced by the capacitor 20. The time spaces $t_i$ preferably have a value of about 50 $\mu s$, which corresponds to a frequency of 20 kHz, which is normally no longer audible.

The duty cycle, which is equal to the ratio $t_{i1}/ti_{2}$, is preferably selected smaller than 50%. A burst mode operation of the switching elements additionally reduces the overall losses of the DC to DC converter.

The invention also relates to DC to DC converters that produce more than two output voltages. The necessary measures lie within the framework of the normal operation of the expert who has knowledge of the invention and the already known DC to DC converters, and they will not be explicitly described here.

What is claimed is:

1. A DC to DC converter for converting a DC input voltage into a plurality of DC output voltages, including:
   a circuit stage including switching elements for converting the DC input voltage into a first AC signal,
   a first resonant circuit for converting the first AC signal into a second AC signal, which is used for forming a first DC output voltage,
   a second resonant circuit for converting the first AC signal into a third AC signal, which is used for forming a second DC output voltage and
   a control circuit for changing frequency ranges for the first AC signal.

2. A DC to DC-converter as claimed in claim 1, wherein a transformer is provided realizing a separation of potential between a first, a second and a third AC signal, which transformer has a primary winding assigned to the first resonant circuit, a first secondary winding assigned to the first resonant circuit and a second secondary winding assigned to the second resonant circuit.

3. A DC to DC converter for converting a DC input voltage into a plurality of DC output voltages, comprising:
   a circuit stage including switching elements for converting the DC input voltage into a first AC signal;
   a first resonant circuit for converting the first AC signal into a second AC signal which is used for forming a first DC output voltage;
   a second resonant circuit for converting the first AC signal into a third AC signal which is used for forming a second DC output voltage; and
   a control circuit for setting various frequency ranges for the first AC signal;
   wherein, with frequencies from the first frequency range, the first DC output voltage lies in a voltage range that has larger voltage values than another voltage range in which the first output voltage with frequencies from the second frequency range lies, and
   wherein the second DC output voltage lies in substantially the same voltage range both with frequencies from the first frequency range and from the second frequency range.

4. A DC to DC converter as claimed in claim 3, wherein the first frequency range corresponds to a power supply mode of normal operation and the second frequency range corresponds to a standby power supply mode.

5. A DC to DC converter as claimed in claim 1, wherein the circuit stage for converting the DC input voltage into the first AC signal has a half-bridge circuit including two switching elements or a full-bridge circuit including four switching elements.

6. A DC to DC converter as claimed in claim 5, wherein the half-bridge or full-bridge circuit is used for operation in a burst mode.

7. A DC to DC converter as claimed in claim 5, wherein an inductive output load of the half-bridge or full-bridge circuit is provided.

8. A DC to DC converter as claimed in claim 1, wherein the DC output voltages are controlled to predefinable set values by adapting the frequency of the first AC signal.

9. A DC to DC converter as claimed claim 1, wherein the control circuit is used for setting the converter to one of the frequency ranges in dependence on a digital signal applied to the control circuit.

10. A DC to DC converter as claimed in claim 2, wherein the first resonant circuit includes two capacitive elements and two inductive elements and in that the second resonant circuit includes two capacitive elements and one inductive element.

11. A power supply with a DC to DC converter as claimed in claim 1.

12. A DC to DC converter for converting a DC input voltage into a plurality of DC output voltages, including:
    a circuit stage for converting the DC input voltage into a first AC signal;
    a resonant circuit for converting the first AC signal into a second AC signal and a third AC signal, wherein a first DC signal is formed from said first AC signal and a second DC signal is formed from said second AC signal; and
    a control circuit for changing frequency ranges, wherein a value of said first DC signal changes in response to changing said frequency ranges.

13. The DC to DC converter of claim 12, wherein said control circuit changes said frequency ranges for said first AC signal.

14. The DC to DC converter of claim 12, wherein a value of said second DC signal remains substantially unchanged in response to changing said frequency ranges.

15. The DC to DC converter of claim 12, wherein said value of said first DC signal changes between a predetermined value and substantially zero in response to changing said frequency ranges.

* * * * *